W. G. PRICE.
BRAKE SHOE CONTROLLER.
APPLICATION FILED JUNE 26, 1908.

1,045,180.

Patented Nov. 26, 1912.

2 SHEETS—SHEET 1.

WITNESSES.

INVENTOR.

W. G. PRICE.
BRAKE SHOE CONTROLLER.
APPLICATION FILED JUNE 26, 1908.
1,045,180.
Patented Nov. 26, 1912.
2 SHEETS—SHEET 2.
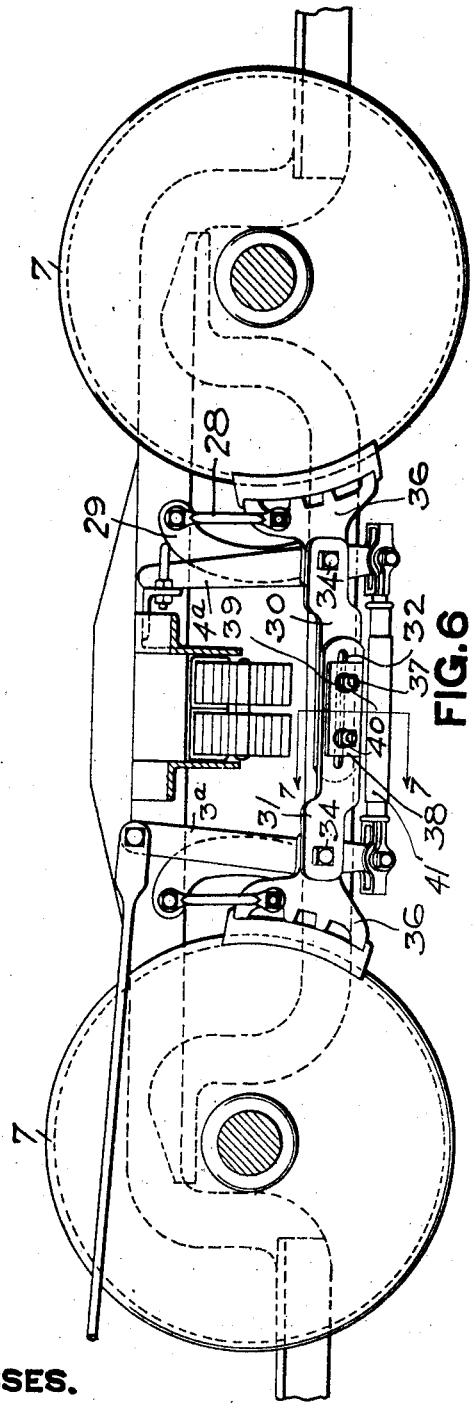

UNITED STATES PATENT OFFICE.

WILLIAM GUNN PRICE, OF NEW CASTLE, PENNSYLVANIA.

BRAKE-SHOE CONTROLLER.

1,045,180.     Specification of Letters Patent.     Patented Nov. 26, 1912.

Application filed June 26, 1908. Serial No. 440,533.

*To all whom it may concern:*

Be it known that I, WILLIAM G. PRICE, a resident of New Castle, in the county of Lawrence and State of Pennsylvania, have invented a new and useful Improvement in Brake-Shoe Controllers; and I do hereby declare the following to be a full, clear, and exact description thereof.

My invention relates to what may be termed a brake shoe controller, that is, a device for controlling the movement of the brake shoe so that it will be withdrawn from the wheel in such a manner as not to drag at any point, while at the same time the shoe will be momentarily retarded in its withdrawal from the wheel for the purpose of operating a slack adjuster for car brakes for which I was granted Letters Patent of the United States No. 872,540, December 3, 1907.

To these ends my invention comprises the novel features hereinafter set forth and claimed.

Figure 1:
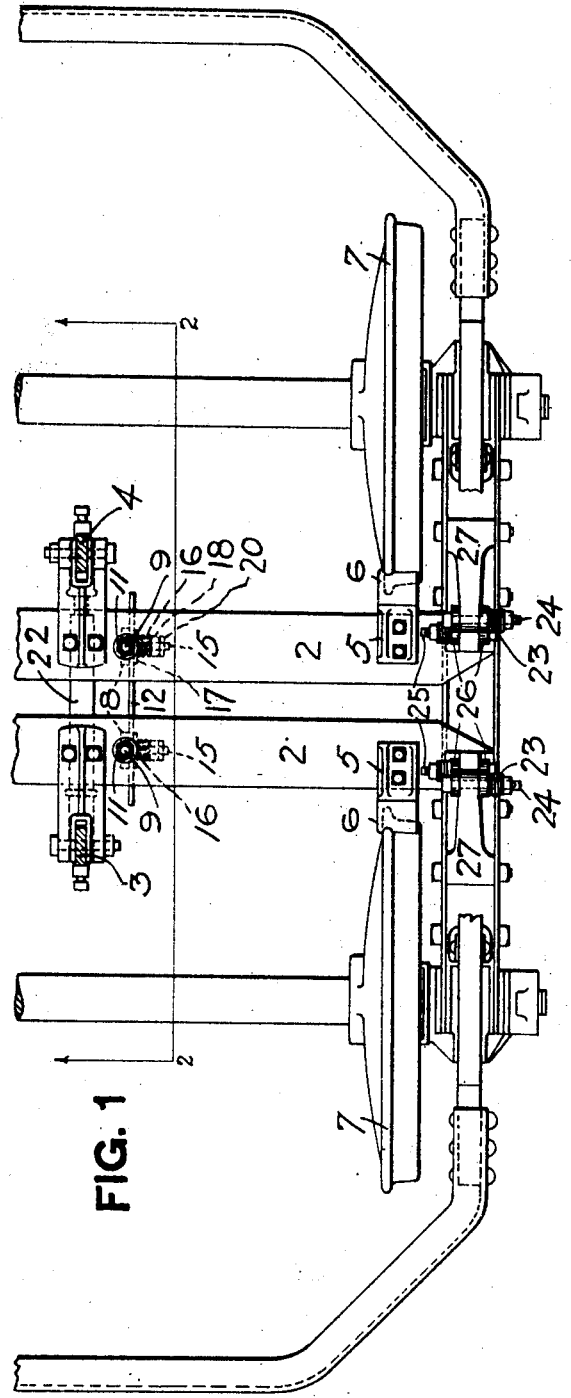
Figure 2:
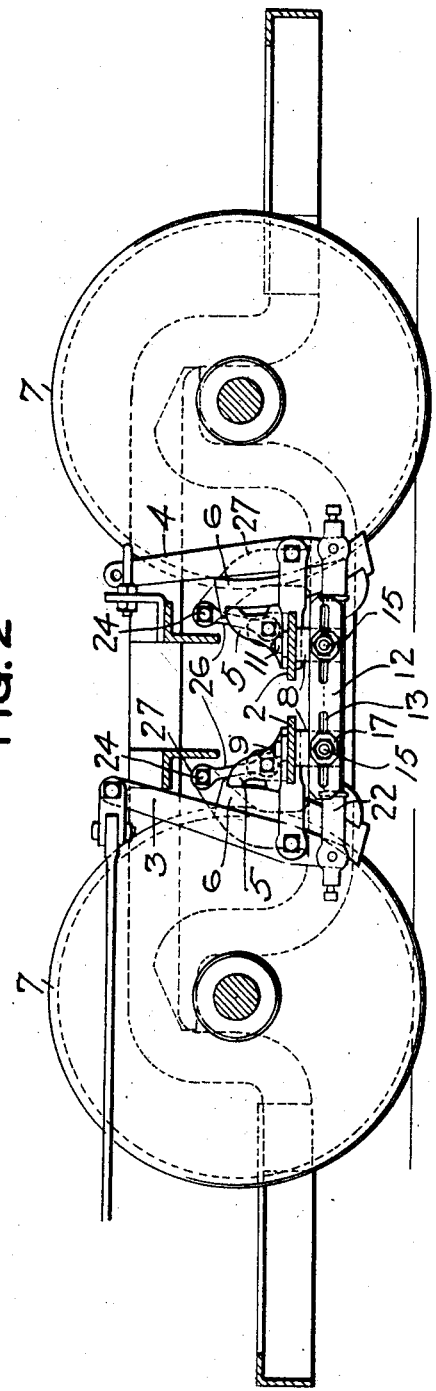

In the accompanying drawings Figure 1 is a plan view of a portion of a common form of truck to which my invention is applied; Fig. 2 is a section on the line 2—2, Fig. 1; Fig. 3 is an enlarged detail of the brake beams and frictional devices; Fig. 4 is an end view of the same; Fig. 5 is a vertical section of a truck showing a modified form of my invention; and Figs. 6 and 7 are details of said modification.

I have illustrated my invention as applied to a motor truck of common construction and have not deemed it necessary to illustrate or describe all the parts which go to make up the truck as such parts form no part of my invention except generally as they go to make up the truck to which the invention is shown as applied.

The brake beams 2 support the live and dead levers 3 and 4 in the ordinary manner. Brake heads 5 are secured to the ends of the brake beams 2 and secured within said brake heads are the brake shoes 6, adapted to be advanced toward and withdrawn from the wheels 7. Projecting down from the brake beams 2 are the brackets or supports 8, said supports being formed with the threaded studs 9 which pass up through openings 10 in the brake beams and nuts 11 are screwed onto said studs. In this manner the supports 8 are securely held in position on the brake beams 2. A frictional member or bar 12 connects the supports 8, said bar having the slots or guides 13 formed therein. Bolts 15 connect the bar 12 to the supports 8, said bolts passing through the slots 13. A spring 16 is interposed between a washer 17 and a nut 18 on the bolt 15. A lock nut 20 may be applied to the bolt 15 bearing against the nut 18. In this manner the bar 12 is held in frictional contact with the supports 8 and this frictional contact may be increased or diminished by means of the nut 18. At the same time the supports 8 are free to move back and forth along the bar 12 when the brake beams are advanced or withdrawn in the operation of the brakes.

In the operation of my invention when the brakes are released the friction created by the supports 8 moving in contact with the bar 12 will tend to momentarily resist the withdrawal of the brake shoes from the wheels, while at the same time the brake shoes are moved outwardly at all points simultaneously so that there is no dragging of any portion of the shoe upon the wheel. This is due to the guiding action of the guides on the bar 12 which hold the brake beams from being tilted or canted by the weight of the live and dead levers, as well as the brake shoes which are all to one side of the brake beam hangers and which consequently tend to tilt or rotate the said beams. The momentary retardation of the withdrawal of the brake shoes from the wheels when the brakes are released due to the friction of the supports 8 moving in contact with the bar 12 and the movement of the live lever acts to bring the slack adjuster 22 into play, fully illustrated and described in said Letters Patent above referred to, but which I have not deemed it necessary to here illustrate and describe in detail.

In addition to the retarding means above described I may use in connection with my invention the springs 23 which are mounted on the bolts 24 and 25 which connect the links 26 to the hanger 27 and to the brake beams 5. These springs 23 act to momentarily retard the withdrawal of the brake heads and this frictional device is covered by Letters Patent of the United States granted to me on the 24th day of April, 1906, No. 818,639.

I thus provide a brake beam suspended from the hangers with friction devices above and below the same so that the frictional resistance is evenly distributed and the more even withdrawal of the brake shoe is obtained.

In Fig. 5 I have illustrated my invention as applied to a truck in which brake beams are not employed but in which the brake heads and shoes are supported by the hangers 28 depending from the brackets 29. In this case I employ two bars 30 and 31, said bars being provided with the slots 32 and the bolt holes 33. Bolts 34 pass through the bolt holes 33 and secure the bars to the brake heads 36 and also support the live and dead levers 3ª and 4ª. The bars 30 and 31 are held in contact with each other and bolts 37 pass through the slots 32. Washers 38 are provided on opposite sides of the bars 31 and springs 39 are interposed between the inner washers and the nuts 40 on the bolts 37. In the same manner as above described, when the brakes are released the frictional contact of the bars 30 and 31 moving in contact with each other, aided by the springs 37, will momentarily retard the withdrawal of the brake shoes and at the same time will so guide the shoes as to provide for their simultaneous withdrawal at all points from the tread of the wheel and at the same time provide for the operation of the slack adjuster 41.

What I claim is:

1. In a brake-shoe controller, the combination of shoe supporting devices arranged to support the shoes contiguous to the wheels of opposite axles, a frictional member connecting said devices, said devices and frictional member movable the one with relation to the other, and means for holding said devices in frictional contact with said member.

2. In a brake-shoe controller, the combination of shoe supporting devices, a longitudinal frictional member connected to the shoe supporting devices, and means for creating friction on the frictional member to retard the movement of the brake shoes.

3. In a brakeshoe controller, the combination of shoe supporting devices arranged to support the shoes contiguous to the wheels of opposite axles, a frictional member connecting said devices, said devices and frictional member movable, the one with relation to the other, and a spring for holding said devices in frictional contact with said member.

4. In a brake-shoe controller, the combination of shoe supporting devices, a bar connecting said devices, said devices movable on said bar, and a spring for holding said devices in frictional contact with said bar.

5. In a brake-shoe controller, the combination of shoe supporting devices, a bar connecting said devices having guides therein with which said supporting devices engage, and means for holding said devices in frictional contact with said bar.

6. In a brake-shoe controller, the combination of shoe supporting devices, a bar connecting said devices, said bar having slots therein with which said supporting devices engage, and means for holding said devices in frictional contact with said bar.

7. In a brake-shoe controller, the combination of shoe supporting devices, a bar connecting said devices having slots therein, bolts passing through said devices and through said bar, and a spring interposed between said bar, and a stop on said bolt.

8. In a brake-shoe controller, the combination of shoe supporting devices, a bar connecting said devices having slots therein, bolts passing through said supporting devices and through said plate, washers on said plate, and springs interposed between said washers, and stops on said bolts.

9. In a brake-shoe controller, the combination of brake beams carrying brake-shoes, a bar connecting said brake beams, said beams movable along said bar, and means for holding said brake beams in frictional contact with said bar.

10. In a brake-shoe controller, the combination of brake beams having downwardly projecting portions, bars connecting said downwardly projecting portions, said downwardly projecting portions movable along said bar, and means for holding said downwardly projecting portions in frictional contact with said bar.

11. In a brake-shoe controller, the combination of brake beams, shoes carried thereby, and frictional devices above and below said brake beams to momentarily retard the withdrawal of said shoes from the wheels.

12. In a brake-shoe controller, the combination of suspended brake beams, shoes carried thereby, and frictional devices above and below said brake beams to retard the withdrawal of said shoes from the wheels.

13. In a brake-shoe controller, the combination of suspended brake-beams, shoes carried thereby, frictional devices above and below said brake beams to momentarily retard the withdrawal of said shoes from the wheels, and guiding means for said brake beams.

14. In a brake-shoe controller, the combination of shoe supporting devices, a guide member connected to said supporting devices, and means for creating friction to momentarily retard the withdrawal of said shoes from the wheels.

In testimony whereof, I the said WILLIAM G. PRICE, have hereunto set my hand.

WILLIAM GUNN PRICE.

Witnesses:
ROBERT C. TOTTEN,
J. R. KELLER.